United States Patent [19]

Swanson

[11] Patent Number: 4,790,964
[45] Date of Patent: Dec. 13, 1988

[54] VEHICLE MOUNTED RAM-AIR POWERED AERATOR FOR LIVE FISH CONTAINERS

[76] Inventor: Randy G. Swanson, R.D. #3, Box 430A, Stewartstown, Pa. 17363

[21] Appl. No.: 175,954

[22] Filed: Mar. 31, 1988

[51] Int. Cl.⁴ ............................................. H01K 63/02
[52] U.S. Cl. ..................................... 261/121.2; 43/56
[58] Field of Search .......................... 261/121.2; 43/56

[56] References Cited

U.S. PATENT DOCUMENTS

| | | | |
|---|---|---|---|
| 1,991,149 | 2/1935 | Haislip | 43/56 |
| 2,268,071 | 12/1941 | Grange, Sr. | 43/56 |
| 2,330,870 | 10/1943 | Collier | 43/56 |
| 2,680,646 | 6/1954 | Bush | 296/44 |
| 2,738,613 | 3/1956 | Styer | 43/56 |
| 3,196,576 | 7/1965 | Thomas, Sr. | 43/56 |
| 3,348,826 | 10/1967 | Karley | 261/121 |

Primary Examiner—Tim Miles
Attorney, Agent, or Firm—Robert F. Palermo

[57] ABSTRACT

A vehicle mounted ram-air powered aerator for live fish containers is disclosed comprised of a generally funnel-shaped air collector having an angular discontinuity between its forward and rearward sections which increases internal turbulence and improves air collection efficiency; an air collection port displaced forward from the back wall of the collector, thereby defining a rainwater sump having holes to drain away the water to prevent flooding of the fish container and also, incidentally, to improve the air flow pattern such that collection efficiency is improved. The collector is integrally molded with a stand-off/support arm and vehicle window mounting clip so designed as to position the collector above and outboard of the low-pressure region of the vehicle slip stream and to thus further improve air collection efficiency. The air collector port is protected from blockage due to large insects and airborne debris by means of an easily removable screen positioned at the mouth of the collector and having rectangular apertures with tapered sidewalls to maximize air flow. The collected air is delivered to the fish container by means of a flexible air tube.

11 Claims, 2 Drawing Sheets

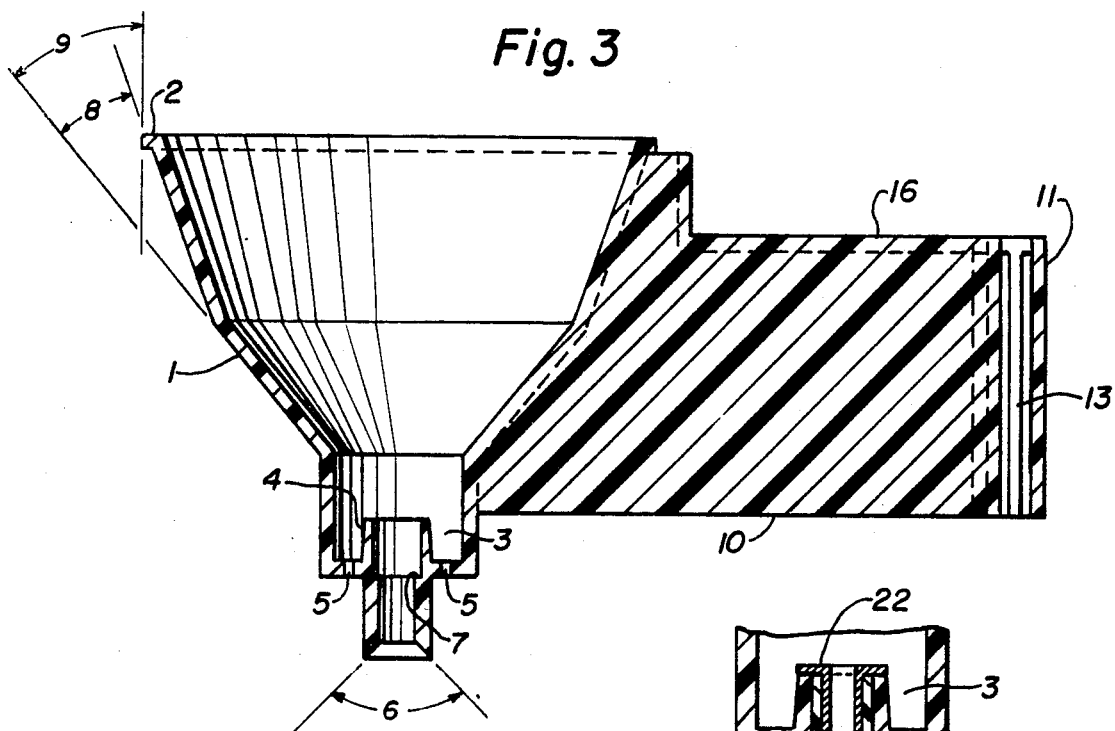
Fig. 3
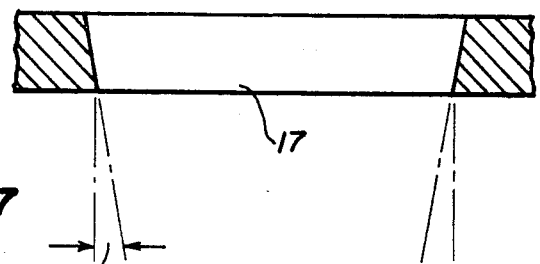
Fig. 4
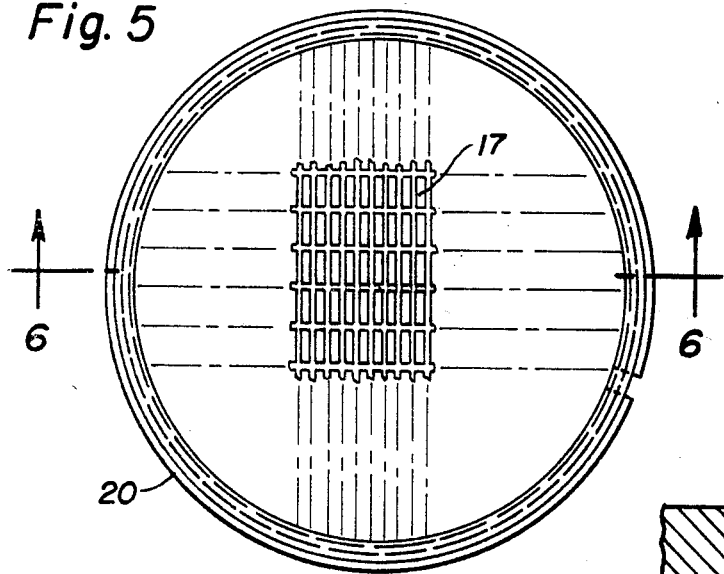
Fig. 5
Fig. 7
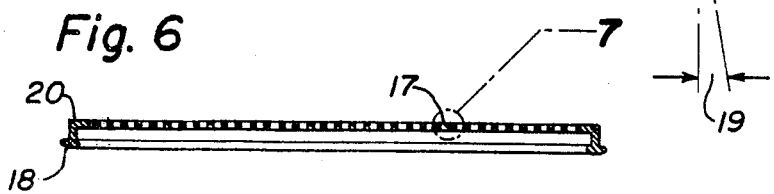
Fig. 6

VEHICLE MOUNTED RAM-AIR POWERED AERATOR FOR LIVE FISH CONTAINERS

This invention provides improvements in vehicle mounted aerating devices for live fish or bait containers.

BACKGROUND OF THE INVENTION

When transporting live bait, such as minnows or the like, to distant fishing sites, or when transporting trophy fish from such fishing sites to a taxidermist or another body of water, it is necessary to provide aeration to the water filled container to replenish the oxygen which is consumed by the fish. This maintains the minnows or fish alive for the duration of the trip.

One method of providing such aeration is by using electrically powered air pumps. These pumps are powered either by the vehicle battery or by batteries integral to the pumps. Since such pumps are inexpensively built, they have short service lives and cannot be repaired. In addition, they often entail the expense of batteries.

Since this invention is powered by ram-air provided by motion of the vehicle, it has no moving parts and consumes no electrical power. This overcomes the two primary disadvantages of the electrically operated pumps.

Other ram-air powered aerators which have been offered in the past do not address the problem of flooding of the container, which can occur while driving during periods of rainfall. The aerator, while collecting ram-air, collects rain water as well. This invention rejects rainwater while still collecting ram-air. Other improvements in design and placement of the collector provide greater collection efficiency and hence, permit aeration at lower vehicle speeds.

DESCRIPTION OF THE INVENTION

One object of this invention is to provide a simple device which is readily mounted on a vehicle and which collects the ram-air incident to the motion of the vehicle and directs it into a live fish container to aerate the water.

Another object is to provide the aerating device in such manner as to improve collection efficiency over existing ramair powered aerators and to eliminate the possibility of flooding of the container when the aerator is used during periods of rainfall.

Contemplating these and other objects, this invention consists of the design, combination, and arrangement of the various parts of the device to accomplish said objects as more fully set out in the specification and claims, and as illustrated in the accompanying drawings, in which:

FIG. 3 is a sectional plan view of the aerator body, along line 3—3 of FIG. 2, viewed in the direction of the arrows.

FIG. 4 is an enlarged view of the rearmost section of the collector funnel showing details of the assembly of the air tubing to the collector funnel, the water collection area or sump, and the water drain holes.

FIG. 5 is a front elevation view of the screen provided to prevent entry of large insects or airborne debris into the collector.

FIG. 6 is a sectional plan view of the screen, along line 6—6 of FIG. 5, viewed in the direction of the arrows.

FIG. 7 is an enlarged view of the screen aperture, at the area 17 of FIG. 6, showing the tapered geometry of the apertures.

This invention will be readily understood so that one skilled in the art can make and use said invention by having reference to this specification and the drawings.

Figure 1:
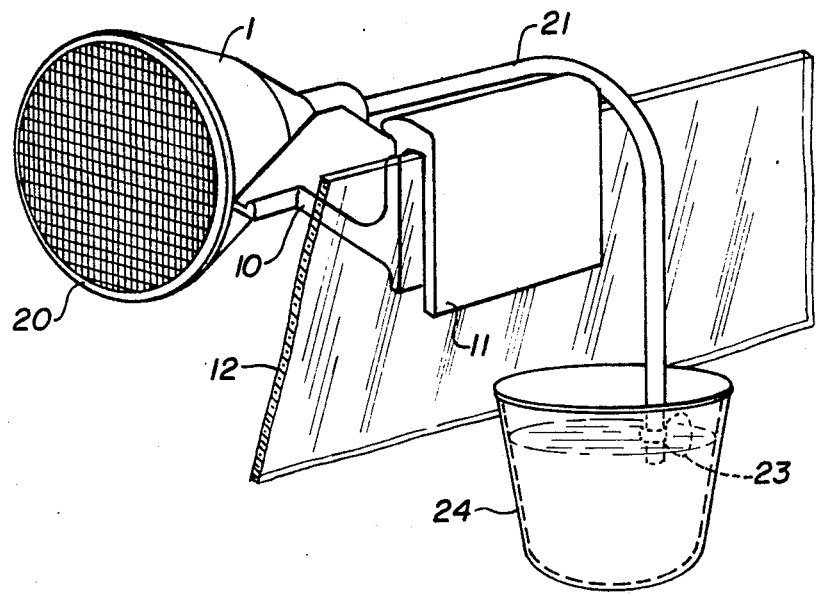
FIG. 1 is an overall view of the aerator in one exemplary embodiment which shows the installation and general configuration and arrangement of components of the invention.

Referring to FIG. 1, the invention is seen in its preferred embodiment mounted to the passenger window of a vehicle. The ram-air collector 1 is shown with its integral stand-off/support arm 10 and its integral window clip 11 mounted to the topmost portion of the passenger window 12. These three components are molded, as a unit, of a suitable rigid polymeric material. Attached to the trailing end of the collector 1 is a flexible polymeric tube 21 which leads to the fish container 24 and is preferably secured to the fish container 24 at the appropriate depth with a suction cup 23 clamped to the outlet end of the tube 21. If the container 24 has a rough or porous surface the tube 21 may be secured by a wire clip or other means. At the forward, or large, end of the collector is shown the removable screen 20, which is provided to prevent entry into the collector of large insects or airborne debris.

Figure 2:
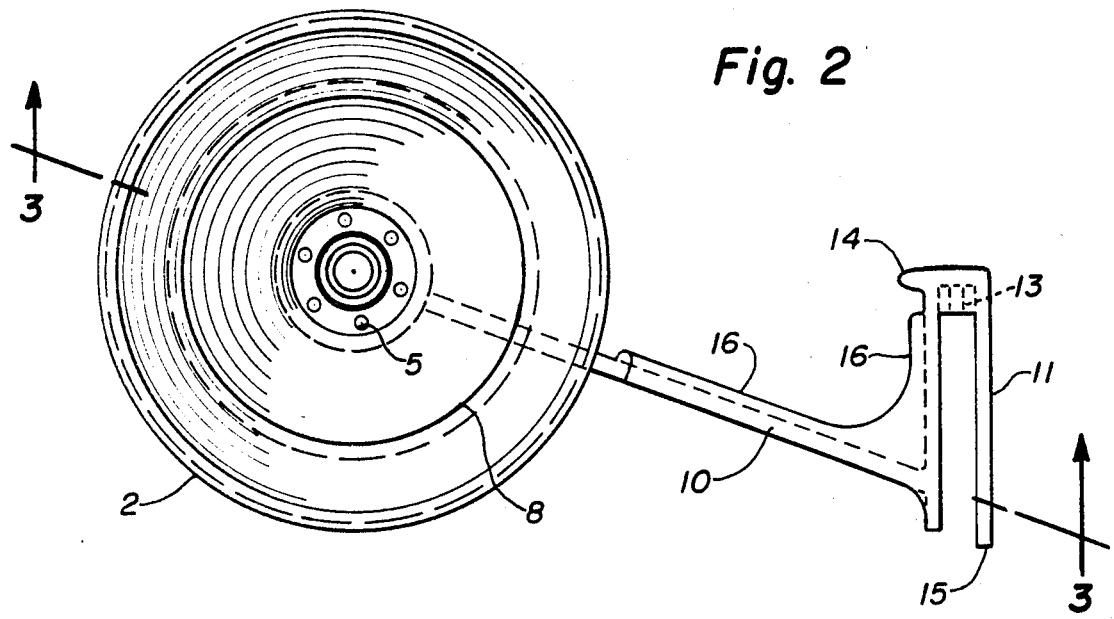
FIG. 2 is a front elevation view of the aerator body showing the water drain holes radially disposed about the central air collection port, the window mounting clip, and the collector stand-off/support arm.

A more detailed understanding of the design features of the aerator body may be had by reference to FIG. 2 which presents a frontal elevation view of the integrally molded aerator body. At the forward rim of the collector is a locking ridge 2 which secures the screen when it is snapped onto the collector. Approximately midway between the forward and rearward sections of the collector is an angular discontinuity 8 in the sidewall of the collector, which is provided to enhance the collection pressure of the air. At the rearmost section of the collector, radially disposed about the central port are six equally spaced holes 5 which drain away any rain water that is collected during periods of rain. The stand-off/support arm 10 is of sufficient length, approximately five inches, and at an appropriate angle, approximately 20° above horizontal, to prevent interference with air collection by the low-pressure slip stream of the moving vehicle and to thereby further enhance air collection pressure and efficiency. A gusset and reinforcing ridge 16 are molddd into the stand-off/support arm 10 to provide rigidity to the aerator arm. The window mounting clip 11, also molded to the gusset 16 and stand-off/support arm 10, has a ridge 14 molded along its topmost outboard edge to prevent entry into the window channel when the window is closed upon the window mounting clip 11. Along the topmost interior portion of the clip 11 is molded a spacer ridge 13, which provides a sufficient window gap to allow passage of the flexible tube from the collector to the fish container through the resultant window gap. The inner leg 15 of the window mounting clip 11 is extended for ease in installing the aerator body on the window.

The sectional view of the aerator body presented in FIG. 3 reveals, in greater detail, the design features of the aerator body. The screen retaining ridge 2 is shown at the forward face of the ram air collector 1. The forward wall of the collector 1 forms an angle of approximately 25° with the collector axis. The rearward collector wall forms an angle 9 of approximately 40° with the collector axis. This produces an angular discontinuity 8 of approximately 15° between the forward and rearward sections of the collector body 1 which increases internal turbulence and enhances air collection pressure. The air collection port is formed by the tapered wall 4 and is surrounded by a rainwater collection sump 3 having water drain holes 5. Within the collection port is a shoulder 7, defined by a decrease in diameter, which serves to lock the tubing in place. A chamfer 6 provides for easy insertion of the tubing during assembly. The relative sizes and dispositions of the stand-off/support arm 10, window mounting clip 11, reinforcing ridge 16, and spacer ridge 13 are also represented.

Referring to FIG. 4, the method for assembling and securing the tube 21 is described thus. The flexible polymeric tube 21 is inserted into the air collection port defined by wall 4 of FIG. 3 until it is approximately ½ inch past flush with the forward face of the port. A brass ferrule 22 is inserted into the end of the tube 21, and the tube 21 is withdrawn until it is locked against the shoulder 7 of FIG. 3 by the expansion of the tube 21 diameter caused by the insertion of the ferrule 22. It is now securely fastened to the aerator body with minimum constriction of the internal tube diameter.

The screen 20 is illustrated in FIG. 5, which shows the rectangular geometry of aperture 17 and the edge notch designed to fit around the stand-off/support arm. The sectional view of FIG. 6 illustrates the screen retaining rim 18, and the enlarged view, in FIG. 7, of section 17 of FIG. 6 shows the taper 19 of the aperture sidewalls, approximately 6° on each side. This design allows for a greater percentage of open surface on the screen and enhances air flow into the collector.

OPERATION OF THE INVENTION

In order to use this invention to aerate a live fish container, it is necessary to first assemble it. This is done by first inserting the flexible polymeric air tube into the collector through the air collection port until it is approximately ½ inch past flush with the forward face of the air collection port wall, then inserting the brass ferrule into the end of the tube to expand it, and then withdrawing the tube slightly to lock it in place against the shoulder within the air collection port. The screen is then snapped in place over the forward collector face with the notch of the screen aligned with the stand-off/support arm of the aerator body until the retaining rim is securely seated behind the locking ridge of the collector. The window mounting clip is pressed firmly onto the top edge of the passenger-side window of the vehicle, with the collector mouth facing forward, the air tube routed through the window opening, and the window is raised until the ridge at the top of the mounting clip is firmly seated against the outboard edge of the window channel. The outlet end of the air tube is secured in the fish container approximately one-half (½) inch below the water surface using the suction-cup clamped to the end of the tube. The aerator will then be ready to operate.

When the vehicle reaches approximately twenty (20) miles per hour, the aeration process begins. Note that the speed at which aeration begins depends upon the inside tube diameter, preferably approximately one-quarter (¼) inch; the tube length which should be only as long as necessary to reach to the fish container from the collector; the wind velocity and direction; and the depth at which the tube outlet is placed below the water surface, preferably approximately one-half (½) inch to one (1) inch deep so that the hydrostatic pressure will not be so great as to prevent aeration at legal speeds.

The ram-air collector design incorporating the angular discontinuity increases turbulence within the collector and enhances the air pressure at the collection port. Incorporation of the water drain holes, in addition to draining away rainwater to prevent flooding of the container, produces a reduction in speed at which aeration begins. This is apparently due to collection pressure and flow enhancement caused by splitting the air flow between the collection port and the drain holes.

Placement of the aerator on the passenger side of the vehicle protects it from the heavy buffeting caused by vehicles traveling in the opposite direction on two-lane highways and the possibility of damage due to buffeting.

I have described one application of my invention; however, it is contemplated that this device can be equally applied to boats, trailers, or other moving conveyances and to any container for transportation of live aquatic animals.

The foregoing description and drawings, present my invention in its preferred embodiment. It is clear that various modifications may be made in size, shape, materials of construction, and arrangement of the components without departing from the spirit and purpose of my invention.

The claims of my invention consist of:

1. A vehicle mounted ram-air powered aerator for live bait or fish containers consisting of a generally funnel-shaped air collector having an angular discontinuity of 15° to 30° in its sidewalls to enhance collection pressure and efficiency; an air collection port having its entrance displaced approximately one-half (½) inch to three-quarters (¾) inch forward of the rear wall of the collector; a rainwater sump region having two (2) to eight (8) drain holes to prevent flooding of the container during periods of rainfall and to enhance collection pressure and efficiency; an easily removable screen to prevent entry of large insects and airborne debris; a stand-off/support arm 2 to 10 inches in length and inclined 20° to 40° above the horizontal to position the air collector outboard of and above the low-pressure slip stream of the vehicle; a window mounting clip having a space maintainer ridge to provide a window gap for passage of the air tube into the vehicle; a flexible tube of one-quarter (¼) inch to one-half (½) inch inside diameter to channel the air from the collection port of the collector to the fish container; and a clamping device to secure the outlet of the air tube at the proper location within the fish container.

2. An aerator, as in claim 1, wherein the wall angle of the collector, with respect to the collector axis, changes from approximately 25° to approximately 40° at the angular discontinuity of the collector wall.

3. An aerator as in claim 1, wherein the air collection port is displaced approximately one-half (½) inch forward of the rear wall of the collector.

4. An aerator, as in claim 1, wherein the rainwater sump is drained by six (6) equally spaced drain holes.

5. An aerator, as in claim 1, wherein the screen for elimination of large insects and airborne debris has rectangular apertures with tapered walls to maximize volumetric air flow rate and air flow velocity 6. An aerator, as in claim 1, having a stand-off/support arm sufficiently long, approximately five (5)

inches, and angled above the horizontal approximately 20° to position the collector above and laterally outside the low-pressure slip stream of the vehicle and thereby to improve air collection pressure and efficiency.

7. An aerator, as in claim 1, wherein the window mounting clip has an internal space-maintaining ridge to provide a window gap through which the air tube can be routed between the exterior collector and the fish container inside the vehicle.

8. An aerator, as in claim 1, in which the flexible air tube has an inside diameter of one-quarter (¼) inch.

9. An aerator, as in claim 1, in which the flexible air tube is attached to the collector by insertion of a rigid ferrule to expand the tube and then withdrawing the tube slightly to lock it against a shoulder in the air collection port so that the attachment is accomplished with minimal constriction of the inside diameter of the air tube.

10. An aerator, as in claim 1, in which the flexible air tube is made from polyvinyl chloride.

11. An aerator, as in claim 1, wherein the outlet end of the air tube is secured at the proper location within the fish container by a clamping device consisting of a suction cup clamped to the tube near its outlet.

* * * * *